United States Patent
Inoue et al.

(10) Patent No.: US 10,923,303 B2
(45) Date of Patent: Feb. 16, 2021

(54) VACUUM CIRCUIT BREAKER, GAS INSULATED SWITCHGEAR AND AIR INSULATED SWITCHGEAR MOUNTED WITH THE VACUUM CIRCUIT BREAKER

(71) Applicant: MITSUBISHI ELECTRIC CORPORATION, Tokyo (JP)

(72) Inventors: Naoaki Inoue, Tokyo (JP); Yusuke Nishimura, Tokyo (JP); Masashi Kawada, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/090,868

(22) PCT Filed: Feb. 24, 2017

(86) PCT No.: PCT/JP2017/007121
§ 371 (c)(1),
(2) Date: Oct. 3, 2018

(87) PCT Pub. No.: WO2017/179315
PCT Pub. Date: Oct. 19, 2017

(65) Prior Publication Data
US 2019/0108956 A1    Apr. 11, 2019

(30) Foreign Application Priority Data
Apr. 12, 2016   (JP) .................................. 2016-079279

(51) Int. Cl.
*H01H 1/58*   (2006.01)
*H01H 33/42*   (2006.01)
(Continued)

(52) U.S. Cl.
CPC ........ *H01H 33/6606* (2013.01); *H01H 33/42* (2013.01); *H01H 33/666* (2013.01);
(Continued)

(58) Field of Classification Search
CPC ......... H01H 33/6606; H01H 33/66207; H01H 33/666; H01H 33/42; H01H 2033/6613;
(Continued)

(56) References Cited

U.S. PATENT DOCUMENTS 3,021,407 A * 2/1962 Jennings .......... H01H 33/66207
200/302.1
7,813,109 B2 * 10/2010 Kikukawa ................ H02B 1/20
218/118
(Continued)

FOREIGN PATENT DOCUMENTS

JP          57082034 U      5/1982
JP          8222090 A       8/1996
(Continued)

OTHER PUBLICATIONS

International Search Report (PCT/ISA/210) dated May 30, 2017, by the Japan Patent Office as the International Searching Authority for International Application No. PCT/JP2017/007121.
(Continued)

*Primary Examiner* — William A Bolton
(74) *Attorney, Agent, or Firm* — Buchanan Ingersoll & Rooney PC

(57) ABSTRACT

A vacuum circuit breaker capable of efficiently dissipating heat generated in a vacuum valve includes a movable side contact and a fixed side contact which are arranged in the inside of the vacuum valve; a fixed side energization shaft to which the fixed side contact is fixed; a movable side energization shaft to which the movable side contact is fixed; an energization connection portion provided at a position where the movable side energization shaft protrudes from the vacuum valve; and a coupling body provided at the outside tip portion of the movable side energization shaft. The (Continued)

coupling body at the outside tip portion of the movable side energization shaft is coupled to an insulation operating rod.

18 Claims, 4 Drawing Sheets

(51) Int. Cl.
*H01H 33/66* (2006.01)
*H01H 33/662* (2006.01)
*H01H 33/666* (2006.01)
*H02B 13/035* (2006.01)

(52) U.S. Cl.
CPC ..... *H01H 33/66207* (2013.01); *H01H 1/5822* (2013.01); *H01H 33/66238* (2013.01); *H01H 33/66261* (2013.01); *H01H 2033/426* (2013.01); *H02B 13/0354* (2013.01)

(58) Field of Classification Search
CPC ....... H01H 33/66238; H01H 33/66261; H01H 2033/426; H01H 1/5822; H02B 13/0356
USPC ....... 218/139, 120, 123, 124, 118, 134, 137, 218/140, 146, 154, 155; 470/14, 12; 200/50.27
See application file for complete search history.

(56) References Cited

U.S. PATENT DOCUMENTS

| 8,089,021 | B2* | 1/2012 | Kagawa | H01H 33/6606 218/118 |
| 8,115,124 | B2* | 2/2012 | Maruyama | H01H 1/5822 200/50.27 |
| 8,283,590 | B2* | 10/2012 | Sasaki | H01H 1/5822 218/14 |
| 9,082,572 | B2* | 7/2015 | Yoshida | H01H 33/6606 |
| 2008/0053810 | A1* | 3/2008 | Hering | H01H 1/5822 200/540 |
| 2009/0255905 | A1* | 10/2009 | Lee | H01H 33/6606 218/139 |
| 2014/0124480 | A1 | 5/2014 | Yoshida | |

FOREIGN PATENT DOCUMENTS

| JP | 2000340076 A | 12/2000 |
| JP | 2006324177 A | 11/2006 |
| JP | 2009009849 A | 1/2009 |
| JP | 2010086898 A | 4/2010 |
| JP | 2015106632 A | 6/2015 |
| WO | 2012172703 A1 | 12/2012 |

OTHER PUBLICATIONS

Written Opinion (PCT/ISA/237) dated May 30, 2017, by the Japan Patent Office as the International Searching Authority for International Application No. PCT/JP2017/007121.

Office Action dated Apr. 17, 2019, by the Chinese Patent Office in corresponding Chinese Patent Application No. 201780019205.6 and English translation of the Office Action. (15 pages).

Office Action dated Dec. 23, 2019 in corresponding Chinese Patent Application No. 201780019205.6 with English Translation, 13 pages.

Office Action dated Jul. 6, 2020, by the Chinese Patent Office in corresponding Chinese Patent Application No. 201780019205.6 and English translation of the Office Action. (13 pages).

* cited by examiner

VACUUM CIRCUIT BREAKER, GAS INSULATED SWITCHGEAR AND AIR INSULATED SWITCHGEAR MOUNTED WITH THE VACUUM CIRCUIT BREAKER

TECHNICAL FIELD

The present invention relates to, for example, a vacuum circuit breaker that improves energization performance of a vacuum valve, and a gas insulated switchgear and an air insulated switchgear which are mounted with the vacuum circuit breaker.

BACKGROUND ART

A vacuum circuit breaker compactifies the circuit breaker by using a vacuum valve that utilizes superior arc extinguishing performance and insulation performance in a vacuum. It is said that the vacuum circuit breaker is more superior in interruption performance and insulation performance than a gas circuit breaker; however, as for energization performance, the vacuum circuit breaker is more inferior than the gas circuit breaker.

The reason is that since vacuum insulation is made in the inside of the vacuum valve, heat generated at a contact portion due to current that energizes the contact portion in the vacuum valve is conducted to the outside only via shafts on the movable side and the fixed side which are linked to contacts of the vacuum valve, and the heat is dissipated outside the vacuum valve.

In general, in order to improve heat dissipation of the vacuum valve, a movable shaft and a fixed shaft of the vacuum valve are made thick to reduce electrical resistance thereof and improve heat conductivity.

RELATED ART DOCUMENT

Patent Document

Patent Document 1: JP-A-2006-324177
Patent Document 2: JP-A-2009-9849

SUMMARY OF THE INVENTION

Problems to be Solved by the Invention

In the aforementioned vacuum circuit breaker, in general, in order to improve the energization performance of the vacuum valve, the movable shaft and the fixed shaft of the vacuum valve are made thick to reduce the electrical resistance thereof and improve the heat conductivity. However, if the movable shaft of the vacuum valve is made thick, the weight of a movable portion increases and accordingly large operational energy is required due to an operating mechanism of the vacuum circuit breaker.

For example, in Patent Document 1 as shown in FIG. 1 of JP-A-2006-324177, a part where the movable shaft of the vacuum valve protrudes to the outside from the vacuum valve is made thicker in diameter than the movable shaft that communicates to the inside of the vacuum valve to improve the heat conductivity. However, since the part of the movable shaft is made thicker in diameter, a problem exists in that the weight of the movable portion increases and the operational energy of the circuit breaker increases.

Furthermore, since the movable shaft of the thick diameter and that of a thin diameter are integrated into one body, it becomes a structure that cannot be assembled if a guide that mechanically supports the thin diameter part of the movable shaft is not divided into plurality; and accordingly, axial misalignment of the movable shaft is likely to be increased. Moreover, the structure is such that tapping/threading is made at the tip of the thick diameter portion of the movable shaft to couple an operating shaft which is for opening and closing the vacuum valve. However, the thick diameter portion and the thin diameter portion of the movable shaft are each formed in a columnar shape and accordingly there is not a portion that prevents the movable shaft from pivoting during screw fastening. Thus, a problem exists in that torsion is applied to a bellows portion which is for airtightly opening and closing the vacuum valve and accordingly vacuum airtight reliability of the vacuum valve is likely to be reduced.

Furthermore, in Patent Document 2 as shown in FIG. 1 of JP-A-2009-009849, a heat dissipation fin is mounted around a terminal that slides and comes into contact with the movable shaft of the vacuum valve to improve heat dissipation performance. However, the heated movable shaft only comes into contact with the terminal itself by a sliding contactor; and accordingly, a problem exists in that heat conductivity from the movable shaft to the terminal is bad and thus the heat dissipation performance from the terminal is not sufficiently exerted, either.

The present invention has been made to solve the problem described above, and an object of the present invention is to provide a vacuum circuit breaker capable of efficiently dissipating heat generated in a vacuum valve.

Means for Solving the Problems

According to the present invention, there is provided a vacuum circuit breaker including: a movable side contact and a fixed side contact which are arranged in the inside of a vacuum valve; a fixed side energization shaft to which the fixed side contact is fixed; a movable side energization shaft to which the movable side contact is fixed; an energization connection portion provided at a position where the movable side energization shaft protrudes from the vacuum valve; and a coupling body provided at the outside tip portion of the movable side energization shaft. The coupling body at the outside tip portion of the movable side energization shaft is coupled to an insulation operating rod. The energization connection portion includes: an energization contact surface formed along the shaft center direction of the movable side energization shaft at the position where the movable side energization shaft protrudes from the vacuum valve; and a split terminal which crosses at right angle to the shaft center of the movable side energization shaft and is fastened by coming in contact with the energization contact surface. Then, the split terminal is connected by coming in contact with the energization contact surface and is formed so as to cover the outer peripheral portion of the coupling body.

Advantageous Effect of the Invention

According to the vacuum circuit breaker according to the present invention, there can be obtained the vacuum circuit breaker capable of efficiently dissipating heat generated in the vacuum valve.

MODE FOR CARRYING OUT THE INVENTION

Embodiment 1

Figure 1:
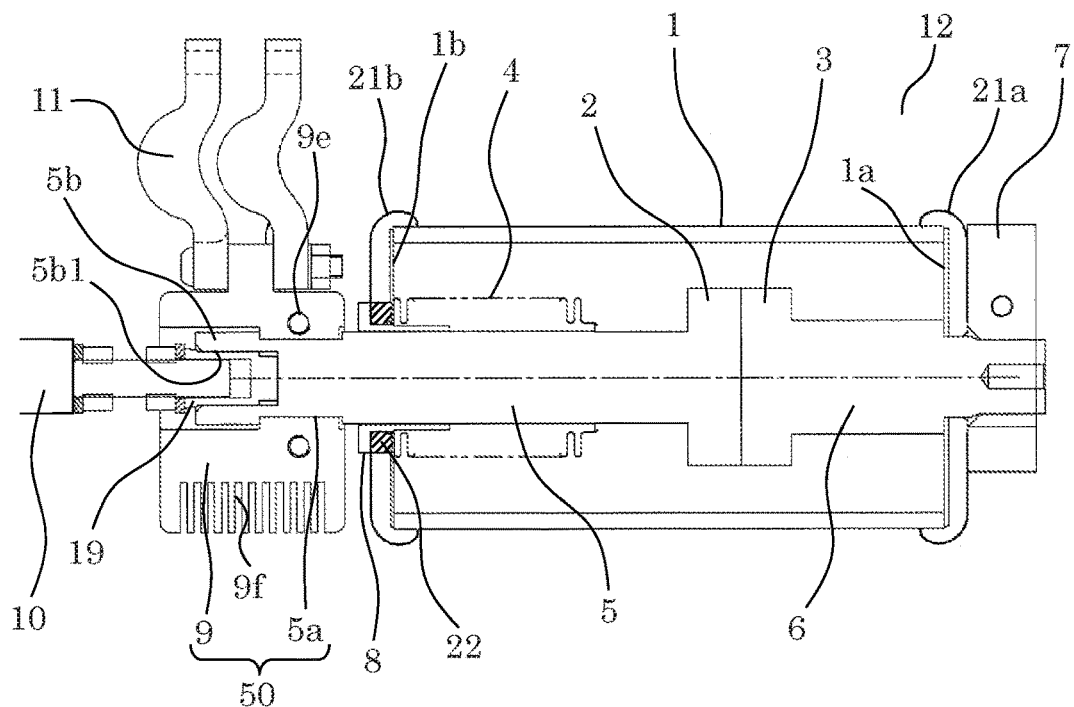
FIG. 1 is a sectional view showing a main circuit in a vacuum circuit breaker according to Embodiment 1 of the present invention.
Figure 2:
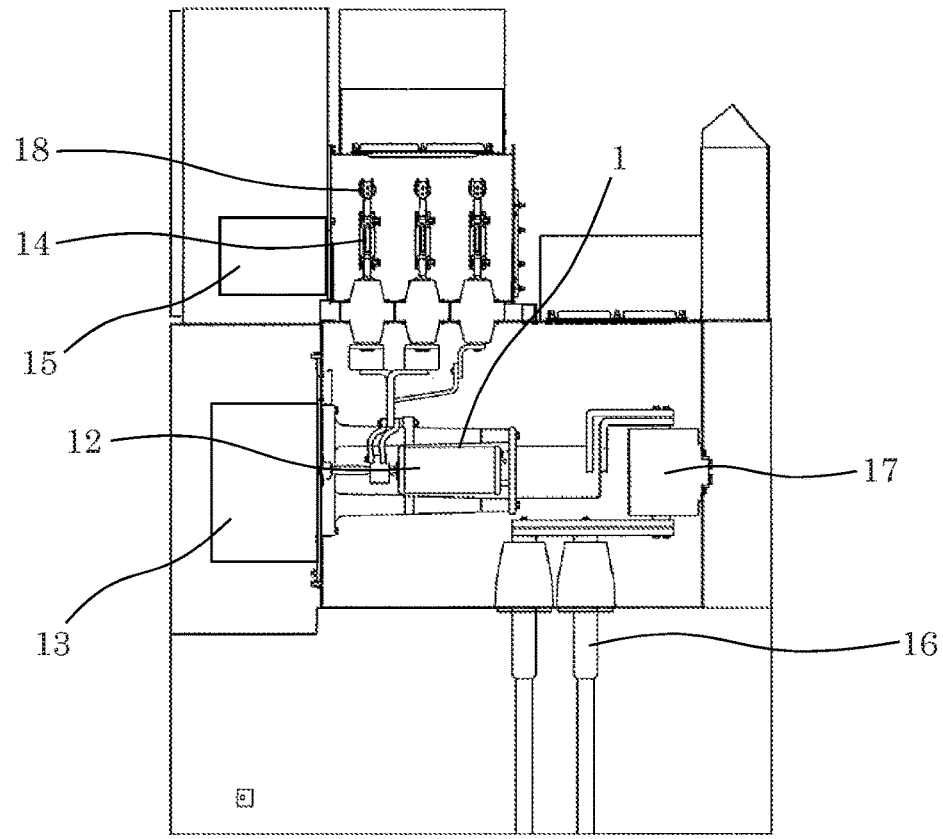
FIG. 2 is a sectional view showing a switchgear mounted with the vacuum circuit breaker according to Embodiment 1 of the present invention.
Figure 3:
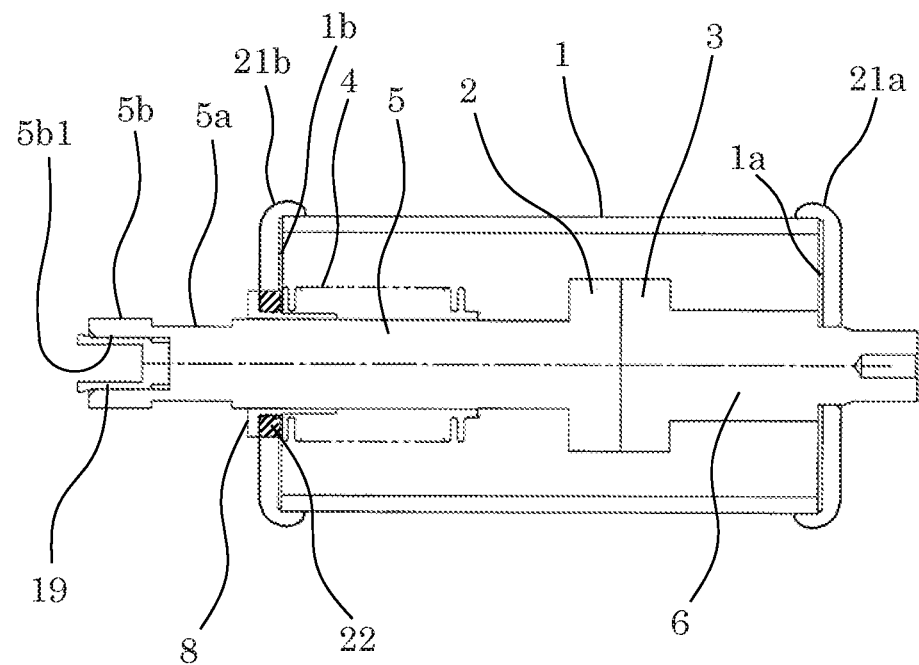
FIG. 3 is a sectional view showing a vacuum valve in the vacuum circuit breaker according to Embodiment 1 of the present invention.
Figure 4:
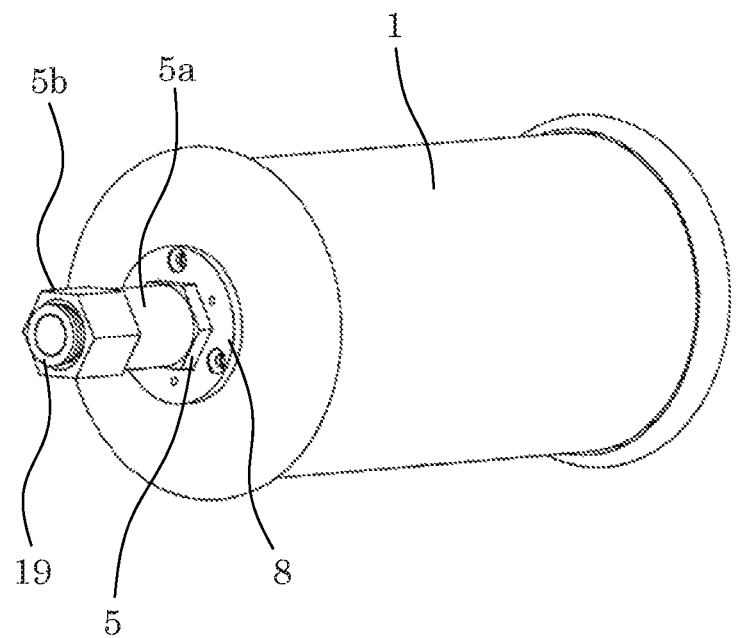
FIG. 4 is a perspective view showing the vacuum valve in the vacuum circuit breaker according to Embodiment 1 of the present invention.
Figure 5:
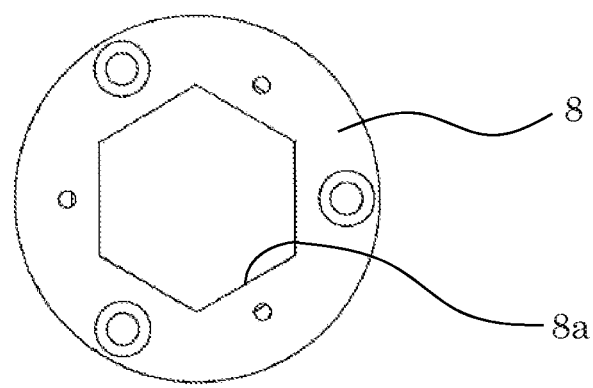
FIG. 5 is a front view showing the guide portion of a movable shaft of the vacuum valve in the vacuum circuit breaker according to Embodiment 1 of the present invention.
Figure 6:
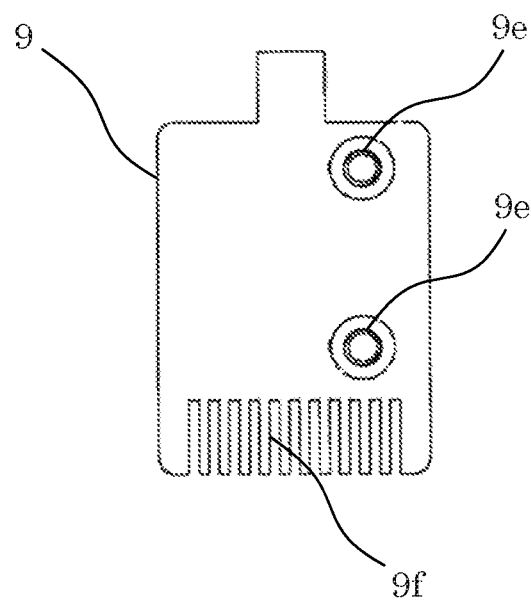
FIG. 6 is a side view showing a split terminal in the vacuum circuit breaker according to Embodiment 1 of the present invention.
Figure 7:
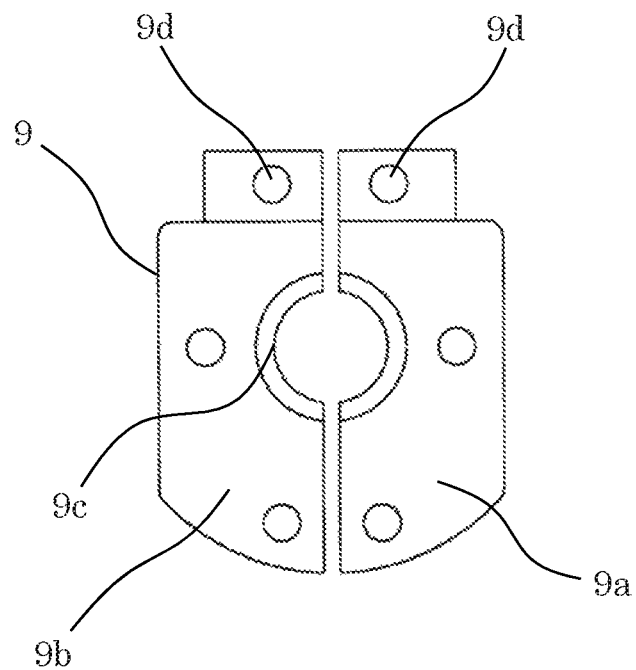
FIG. 7 is a front view showing the split terminal in the vacuum circuit breaker according to Embodiment 1 of the present invention.

Hereinafter, Embodiment 1 of the present invention will be described on the basis of FIG. 1 to FIG. 7. Then, in each of the drawings, identical or equivalent members and portions will be described with the same reference numerals (and letters) assigned thereto. FIG. 1 is a sectional view showing a main circuit in a vacuum circuit breaker according to Embodiment 1 of the present invention. FIG. 2 is a sectional view showing a switchgear mounted with the vacuum circuit breaker according to Embodiment 1 of the present invention. FIG. 3 is a sectional view showing a vacuum valve in the vacuum circuit breaker according to Embodiment 1 of the present invention. FIG. 4 is a perspective view showing the vacuum valve in the vacuum circuit breaker according to Embodiment 1 of the present invention. FIG. 5 is a front view showing the guide portion of a movable shaft of the vacuum valve in the vacuum circuit breaker according to Embodiment 1 of the present invention. FIG. 6 is a side view showing a split terminal in the vacuum circuit breaker according to Embodiment 1 of the present invention. FIG. 7 is a front view showing the split terminal in the vacuum circuit breaker according to Embodiment 1 of the present invention.

In FIG. 1 and FIG. 2, current energized from a cable 16 in the switchgear is energized by paths of an instrument current transformer 17, a vacuum circuit breaker 12, a disconnecting switch 14, and a bus 18. Incidentally, here, for example, a case of a gas insulated switchgear as the switchgear is shown, and a description will be made on the case where the vacuum circuit breaker is mounted on the gas insulated switchgear as an example. However, this embodiment can be applicable to not only the vacuum circuit breaker for the gas insulated switchgear, but also the vacuum circuit breaker to be mounted on an air insulated switchgear that is used in the air. Furthermore, the vacuum circuit breaker 12 is operated by an operating mechanism 13 of the vacuum circuit breaker 12; and the disconnecting switch 14 is operated by an operating mechanism 15 of the disconnecting switch 14.

In the vacuum circuit breaker 12 as shown in FIG. 1, the vacuum valve 1 is configured by a cylindrical insulation tube that uses an insulator such as alumina ceramic as a material; and a fixed side flange 1a and a movable side flange 1b which use metal such as stainless steel as a material are mounted on both end sides of the vacuum valve 1 to form a container so that the inside thereof is kept high vacuum and airtight. A pair of a movable side contact 2 and a fixed side contact 3 which are supported to be capable of being connected/disconnected by a movable side energization shaft 5 and a fixed side energization shaft 6 are arranged in the inside of the vacuum valve 1; and the fixed side contact 3 is connected to the fixed side terminal 7 outside the vacuum valve 1 via the fixed side energization shaft 6 fixed to the fixed side flange 1a. Incidentally, reference numeral 21a denotes a metallic thin sheet disk-shaped fixed side electric field relaxation shield and is retained in a manner being sandwiched between the fixed side energization shaft 6 and the fixed side terminal 7. Furthermore, reference numeral 21b denotes a metallic thin sheet disk-shaped movable side electric field relaxation shield and is retained in a manner being sandwiched between a guide 8 (to be described later) and an attaching seat 22 when the guide 8 is screwed to the attaching seat 22 attached to the end surface of the movable side flange 1b.

The movable side contact 2 is linked to the movable side energization shaft 5 which is inserted through the movable side flange 1b and is extended to the outside. There is shown a case where the movable side energization shaft 5 is formed in a polygonal shape such as a hexagon bar; and an energization connection portion 50 is provided at a position where the movable side energization shaft 5 of the hexagon bar protrudes to the outside of the vacuum valve 1. The energization connection portion 50 includes: an energization contact surface 5a that is formed, for example, in a columnar shape on the outer periphery of, for example, the movable side energization shaft 5 of the hexagon bar; and a split terminal 9 that is to be connected to the energization contact surface 5a. The split terminal 9 is coupled to a flexible conductor 11 to be connected to a movable side terminal. Incidentally, a bellows 4 is brazed to the movable side energization shaft 5, thereby enabling it to advance and retract the movable side energization shaft 5 in closing and opening directions while the inside of the vacuum valve 1 is kept vacuum.

Furthermore, a structure is such that the guide 8 of the movable side energization shaft 5 is placed on the movable side flange 1b at a portion where the movable side energization shaft 5 protrudes to the outside of the vacuum valve 1 to prevent axial misalignment in the case of advancing and retracting the movable side energization shaft 5 in the closing and opening directions. Moreover, the flexible conductor 11 is connected to the split terminal 9, thereby enabling it to advance and retract the movable side energization shaft 5 in the closing and opening directions while securing an energization path of the movable side energization shaft 5.

As an energization path of the vacuum circuit breaker 12, current is energized by paths of the fixed side terminal 7, the fixed side energization shaft 6, the fixed side contact 3, the movable side contact 2, the movable side energization shaft 5, the split terminal 9, and the flexible conductor 11. Moreover, an insulation operating rod 10 of the vacuum circuit breaker 12 is coupled to the tip of the movable side energization shaft 5; and the insulation operating rod 10 is coupled to the operating mechanism 13 of the vacuum circuit breaker 12, thereby enabling it to operate the vacuum circuit breaker 12 in a state where electrical insulation between the operating mechanism 13 of the vacuum circuit breaker 12 and the vacuum valve 1 is maintained.

The movable side energization shaft 5 of the vacuum valve 1 is formed by, for example, the hexagon bar of copper or copper alloy as shown in FIG. 3 and FIG. 4. Furthermore, a structure is such that the guide 8 of the movable side energization shaft 5 shown in FIG. 5 is formed with an insertion hole 8a formed, for example, in a hexagon shape, through which the movable side energization shaft 5 formed by the hexagon bar inserts, to support the movable side energization shaft 5 of the hexagon bar. The movable side energization shaft 5 is formed by the hexagon bar and the guide 8 is formed with the insertion hole 8a of the hexagon shape, whereby the guide 8 not only supports the movable side energization shaft 5 to prevent the axial misalignment when the movable side energization shaft 5 advances and retracts in the closing and opening directions, but also prevents the movable side energization shaft 5 from rotating during assembly.

Incidentally, as described above, the movable side energization shaft 5 is connected to the bellows 4 of the vacuum valve 1; and accordingly, the bellows 4 is twisted when the movable side energization shaft 5 rotates and vacuum airtightness that is the most important performance of the vacuum valve 1 is likely to be reduced.

Furthermore, only a part where the movable side energization shaft 5 of the hexagon bar protrudes to the outside from the vacuum valve 1 is formed in a columnar shape to serve as the energization contact surface 5a with the split terminal 9. A part at the tip side from the energization contact surface 5a of the movable side energization shaft 5 remains the hexagon bar to serve as a wrench catcher portion 5b in fastening.

The guide 8 of the movable side energization shaft 5 is made of a thermosetting or thermoplastic insulator and thus rotation during the advance and retraction of the movable side energization shaft 5 in the closing and opening directions can be prevented; however, when large torque at the time of fastening the movable side energization shaft 5 to the insulation operating rod 10 is supported, the guide 8 is likely to be split if the torque is supported by only the guide 8; and therefore, the structure is such that the wrench catcher portion 5b of the movable side energization shaft 5 is supported by a tool such as a wrench in fastening to the insulation operating rod 10.

Furthermore, a hole 5b1 is formed in the inside of the wrench catcher portion 5b positioned at the tip part of the movable side energization shaft 5; a coupling body 19 made of, for example, a female screw rod is inserted into the hole 5b1 formed in the wrench catcher portion 5b of the movable side energization shaft 5; and the movable side energization shaft 5 and the coupling body 19 made of the female screw rod are bonded by, for example, blazing. Screw fastening is used in fastening to the insulation operating rod 10; however, when tapping/threading is made in the movable side energization shaft 5 made of copper or copper alloy, the copper or copper alloy is low in mechanical strength and thus it cannot endure against large fastening torque. Accordingly, screw threads are stripped; and when the vacuum valve 1 is opened and closed a large number of times, the screw threads are stripped and fastening between the insulation operating rod 10 and the movable side energization shaft 5 is likely to be unfastened. Therefore, a material such as stainless steel, which is stronger in strength than the copper or copper alloy is used for the coupling body 19 made of the female screw rod. Incidentally, in this Embodiment, the coupling body 19 made of the female screw rod is blazed to the wrench catcher portion 5b that is the tip of the movable side energization shaft 5; however, it similarly functions even a male screw but not the female screw.

As shown in FIG. 6 and FIG. 7, the split terminal 9 is a pair of two terminals of a right side split terminal 9a and a left side split terminal 9b; and a part that is formed in a circular shape at a center portion serves as a connection portion 9c of the split terminal 9 with the movable side energization shaft 5. The connection portion 9c of the split terminal 9 is connected to the energization contact surface 5a of the movable side energization shaft 5, thereby enabling it to perform current energization and heat conduction.

Furthermore, a connection portion 9d with the flexible conductor 11, the connection portion 9d being formed at the upper portion of the split terminal 9, is connected to the flexible conductor 11. The lateral surface of the split terminal 9 is formed with fastening portions 9e of the split terminal 9 and the pair of two split terminals 9 are fastened at the fastening portions 9e to be integrated with the movable side energization shaft 5. The split terminal 9 is made of copper or copper alloy having high heat conductivity or made of lightweight aluminum or aluminum alloy. In both cases of the copper or copper alloy and the aluminum or aluminum alloy, silver plating is applied to the surface to be connected to the movable side energization shaft 5 of the vacuum valve 1 to enhance energization performance; and in the case of the copper or copper alloy, bronze plating (bronze plating layer) is applied to the outer periphery; and in the case of the aluminum or aluminum alloy, black alumite treatment (black alumite treatment layer) is applied to the outer periphery.

Since the bronze plating (bronze plating layer) or black alumite treatment (black alumite treatment layer) is applied, a radiation coefficient of the surface is improved as compared to a basis material of the copper or copper alloy and a basis material of the aluminum or aluminum alloy; and therefore, heat transmitted from the inside of the vacuum valve 1 can be effectively dissipated.

Further, the split terminal 9 has a plurality of groove portions 9f at a lower portion thereof, whereby the surface area of the split terminal 9 is increased to improve heat dissipation performance and a reduction in weight of the split terminal 9 is achieved to reduce operational energy of the operating mechanism 13 of the vacuum circuit breaker 12.

Furthermore, since the structure is such that the pair of two split terminals 9 are fastened from both sides of the energization contact surface 5a of the movable side energization shaft 5, the movable side energization shaft 5 and the split terminal 9 are connected in parallel at two points; and current of the movable side energization shaft 5 is divided into the right side split terminal 9a and the left side split terminal 9b on both sides. Therefore, electrical connection resistance between the movable side energization shaft 5 and the split terminal 9 is reduced and heat generation at this part can be suppressed.

As described above, in the configuration of the vacuum circuit breaker shown in Embodiment 1, since the movable side energization shaft 5 of the vacuum valve 1 is connected to the split terminal 9 at the energization contact surface 5a which is a nearest portion where the movable side energization shaft 5 protrudes to the outside of the vacuum valve 1, it becomes the most effective configuration for the current energization and the heat conduction. Then, the structure that prevents the movable side energization shaft 5 of the vacuum valve 1 from twisting during the assembly and during the advance and retraction in the closing and opening directions; the structure that improves fastening property with the insulation operating rod 10; and the structure which achieves the increase in heat dissipation area and the reduction in weight of the split terminal 9 by applying the grooves to the split terminal 9, and the improvement in heat dissipation performance by the surface finishing of the split terminal 9, can be achieved at the same time.

Further, the coupling body 19 made of the female screw rod is inserted into the wrench catcher portion 5*b* that is the tip of the movable side energization shaft 5 to connect mechanically; however, since the split terminal 9 is connected at the energization contact surface 5*a* of the movable side energization shaft 5 which is the nearest position at the outside of the vacuum valve 1, the mechanical connection portion by the coupling body 19 made of the female screw rod does not affect at all on electrical connection and thermal connection with the split terminal 9.

Incidentally, in this embodiment, there has been described the case where the hexagon bar is used for the movable side energization shaft 5; however, since the use of the hexagon bar is for the purpose of preventing the rotation of the movable side energization shaft 5, the present invention is not limited to this, a bar of a polygonal shape such as a quadrilateral shape and a pentagon shape can be used, and the same effects can be exhibited. Furthermore, since the movable side energization shaft 5 is fastened to the split terminal 9, contact resistance is also smaller and energization performance and heat conduction performance are more superior than the state only coming into contact by the sliding contactor as aforementioned conventional example.

The split terminal 9 made of the copper or copper alloy is more superior in energization performance and heat conductivity than that made of the aluminum or aluminum alloy; however, in the case where the black alumite treatment (black alumite treatment layer) is applied to the aluminum or aluminum alloy, this case is higher in radiation coefficient than the case where the bronze plating (bronze plating layer) is applied to the copper or copper alloy; and therefore, the heat dissipation performance is high. Furthermore, since the aluminum or aluminum alloy is more lightweight than the copper or copper alloy, the operational energy of the circuit breaker can be reduced. It depends on a specification condition and a design condition of the entire circuit breaker as to which is more advantage, the split terminal 9 made of the aluminum or aluminum alloy or that made of the copper or copper alloy.

The movable side energization shaft 5 of the vacuum valve 1 of the vacuum circuit breaker 12 is formed by the hexagon bar to support the movable side energization shaft 5 by the guide 8 having the insertion hole 8*a* of the hexagon shape. Only the nearest portion where the movable side energization shaft 5 of the hexagon bar protrudes to the outside of the vacuum valve 1 is formed in the columnar shape to serve as the energization contact surface 5*a*; and the pair of two split terminals 9 are connected from both sides of the energization contact surface 5*a* of the movable side energization shaft 5 to serve as the electrical energization path. Incidentally, the energization contact surface 5*a* shows the case of the columnar shape; however, the present invention is not limited to this, and the same effects can be exhibited even from a triangle shape to a polygonal shape of a decagon shape or more.

Furthermore, the structure is such that the hole is formed in the wrench catcher portion 5*b* that is the tip of the movable side energization shaft 5 and the coupling body 19 made of stainless female screw rod is blazed. Further, the split terminal 9 mounted on the movable side energization shaft 5 is made of the copper having high heat conductivity or the lightweight aluminum. In both cases of the copper or copper alloy and the aluminum or aluminum alloy, the silver plating is applied to the surface to be connected to the movable side energization shaft 5 of the vacuum valve 1 to enhance the energization performance; in the case of the copper or copper alloy, the bronze plating (bronze plating layer) is applied to the outer periphery; and in the case of the aluminum or aluminum alloy, the black alumite treatment (black alumite treatment layer) is applied to the outer periphery.

Furthermore, according to this Embodiment 1, the insulation operating rod 10 is fastened to the coupling body 19 made of the stainless female screw rod, thereby enabling it to mechanically open and close the vacuum valve 1. Since the wrench catcher portion 5*b* that is the tip of the movable side energization shaft 5 of the vacuum valve 1 is formed by the hexagon bar, the hexagon bar part of the wrench catcher portion 5*b* of the movable side energization shaft 5 can be caught in fastening the coupling body 19 made of the stainless female screw rod to the insulation operating rod 10 and thus torque during the fastening does not transmit to the inside of the vacuum valve 1.

Moreover, since the movable side energization shaft 5 of the hexagon bar is supported by the guide 8 having the insertion hole 8*a* of the hexagon shape, the movable side energization shaft 5 does not rotate and there is no concern that the bellows 4 of the vacuum valve 1 is not twisted. Since the split terminal 9 is connected to the movable side energization shaft 5 of the vacuum valve 1 not by coming into contact by the sliding contactor like the aforementioned conventional example, the energization performance and heat conduction performance between the movable side energization shaft 5 of the vacuum valve 1 and the split terminal 9 are high.

Since the movable side energization shaft 5 of the vacuum valve 1 is connected to the split terminal 9 at the energization contact surface 5*a* which is the nearest portion where the movable side energization shaft 5 protrudes to the outside of the vacuum valve 1, heat due to heat generation in the vacuum valve 1 can be efficiently transmitted to the split terminal 9. As for the split terminal 9, as described above, the bronze plating (bronze plating layer) is applied to the outer periphery in the case of the copper or copper alloy; and in the case of the aluminum or aluminum alloy, the black alumite treatment (black alumite treatment layer) is applied to the outer periphery; and therefore, the radiation coefficient of the surface is improved as compared to the cases of the basis material of the copper or copper alloy and the basis material of the aluminum or aluminum alloy and thus the heat transmitted from the inside of the vacuum valve 1 can be effectively dissipated.

Furthermore, since the structure is such that the pair of two split terminals 9 are fastened from both sides of the energization contact surface 5*a* of the movable side energization shaft 5, the movable side energization shaft 5 and the split terminal 9 are connected in parallel at two points; current of the movable side energization shaft 5 is divided into the split terminals 9 on both sides. Therefore, the electrical connection resistance between the movable side energization shaft 5 and the split terminal 9 is reduced and the heat generation at this part can be suppressed. The movable side energization shaft 5 itself is not thickened and, more particularly, when the split terminal 9 is made of aluminum or aluminum alloy, a reduction in weight of the weight of a movable portion can be achieved and thus an increase in operational energy can be suppressed as compared to the case where the movable side energization shaft 5 is thickened.

Moreover, the hole is formed in the wrench catcher portion 5b that is the tip of the movable side energization shaft 5 and the coupling body 19 made of stainless female screw rod is inserted; however, this part is an tip part after current energization and heat conduction are performed from the movable side energization shaft 5 of the vacuum valve 1 to the split terminal 9 and thus it does not affect electrical and thermal performance.

Embodiment 2

Figure 8:
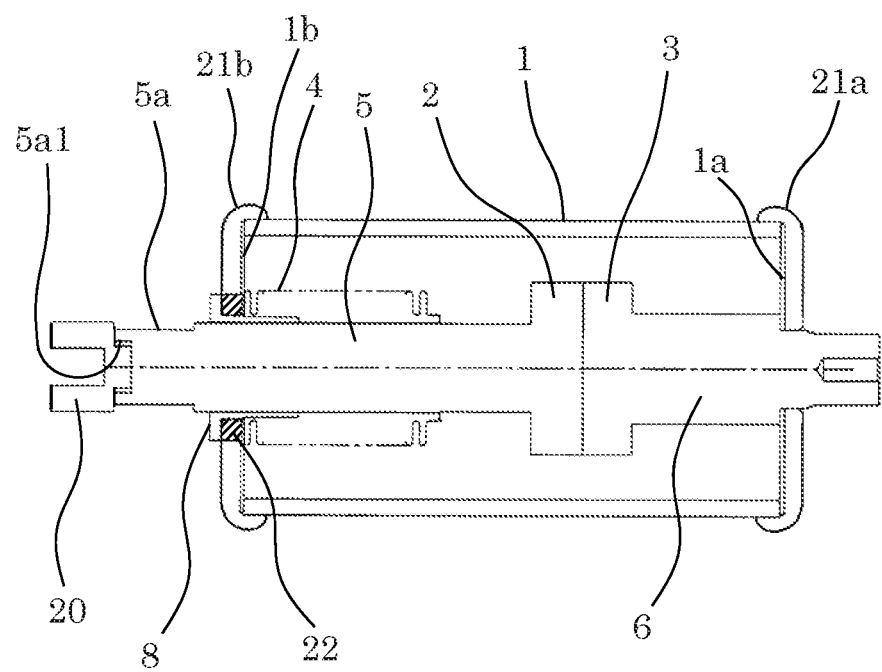
FIG. 8 is a sectional view showing a vacuum valve in a vacuum circuit breaker according to Embodiment 2 of the present invention.

Embodiment 2 of the present invention will be described on the basis of FIG. 8. Then, in the drawing, identical or equivalent members and portions will be described with the same reference numerals (and letters) assigned thereto. FIG. 8 is a sectional view showing a vacuum valve in a vacuum circuit breaker according to Embodiment 2 of the present invention.

A different point from the vacuum valve 1 of FIG. 3 is such that the hole is formed at the tip of the movable side energization shaft 5 in FIG. 3; whereas, in FIG. 8, a coupling body 20 made of a female screw rod in which tapping/threading is made in a stainless hexagon bar is bonded by blazing to the tip of a movable side energization shaft 5. It is the same point that a nearest portion where the movable side energization shaft 5 protrudes to the outside from a vacuum valve 1 is formed in a columnar shape to serve as an energization contact surface 5a with a split terminal 9.

In the configuration of FIG. 3, when the movable side energization shaft 5 is fastened to the insulation operating rod 10, the wrench catcher portion 5b is supported by the tool such as the wrench to apply fastening torque; however, since the wrench catcher portion 5b is made of the copper or copper alloy, there is a case where the hexagon portion of the copper or copper alloy is deformed in the case of excessive fastening torque and regular torque cannot be applied. In the configuration of FIG. 8, a hole 5a1 is formed on the inner side of the energization contact surface 5a as the outside tip portion of the movable side energization shaft 5; and the coupling body 20 made of the female screw rod that is, for example, the stainless hexagon bar is attached by insertion into the hole 5a1 to be bonded by blazing to the inner side of the energization contact surface 5a that is the outside tip portion of the movable side energization shaft 5. The part of the coupling body 20 made of the female screw rod can be used as a wrench catcher and stainless steel is stronger in strength than the copper or copper alloy; and thus, the fastening by larger torque can be performed.

Furthermore, although the aforementioned description has been described in relation to the vacuum circuit breaker, it can also be applied to a gas insulated switchgear and an air insulated switchgear mounted with the vacuum circuit breaker and the same effects can be exhibited.

Incidentally, the present invention can freely combine the respective embodiments and appropriately modify and/or omit the respective embodiments, within the scope of the present invention.

INDUSTRIAL APPLICABILITY

The present invention is suitable to achieve a vacuum circuit breaker capable of efficiently dissipating heat generated in a vacuum valve.

DESCRIPTION OF REFERENCE NUMERALS

1 Vacuum valve, 2 Movable side contact, 3 Fixed side contact, 4 Bellows, 5 Movable side energization shaft, 5a Energization contact surface, 5a1 Hole, 5b1 Hole, 6 Fixed side energization shaft, 7 Fixed side terminal, 8 Guide, 8a Insertion hole, 9 Split terminal, 10 Insulation operating rod, 11 Flexible conductor, 12 Vacuum circuit breaker, 19 Coupling body, 20 Coupling body, 50 Energization connection portion

The invention claimed is:

1. A vacuum circuit breaker comprising:
   a movable side contact and a fixed side contact which are arranged in an inside of a vacuum valve;
   a fixed side energization shaft to which said fixed side contact is fixed;
   a movable side energization shaft in a polygonal shape to which said movable side contact is fixed, the movable side energization shaft having an energization contact surface in a columnar shape formed along a shaft center direction of said movable side energization shaft at a position where said movable side energization shaft protrudes from a movable side flange fixed on a movable side of said vacuum valve, the movable side energization shaft having a wrench catcher portion located at a tip portion of the movable side energization shaft distal the movable side contact, the wrench catcher portion having the polygonal shape;
   an energization connection portion provided at a position where said movable side energization shaft protrudes from said vacuum valve; and
   a coupling body provided at an outside tip portion of said movable side energization shaft,
   wherein said coupling body at the outside tip portion of said movable side energization shaft is coupled to an insulation operating rod,
   wherein said energization connection portion includes:
      the energization contact surface of said movable side energization shaft; and
      a split terminal for performing current energization and which crosses at a right angle to a shaft axis of said movable side energization shaft and is fastened by coming in contact with the energization contact surface, and
   wherein said split terminal is electrically connected by coming in contact with the energization contact surface and is formed so as to cover an outer peripheral portion of said coupling body and the portion of movable side energization shaft formed in the polygonal shape is inserted through a polygonal shaped insertion hole of a guide arranged on the movable side flange of said vacuum valve.

2. The vacuum circuit breaker according to claim 1, wherein said coupling body is made of a member higher in strength than material of said movable side energization shaft and is integrally fixed to the outside tip portion of said movable side energization shaft.

3. The vacuum circuit breaker according to claim 2, wherein said coupling body is made of stainless steel.

4. The vacuum circuit breaker according to claim 2, wherein said coupling body has a female screw formed along the shaft center of said movable side energization shaft.

5. The vacuum circuit breaker according to claim 1, wherein said coupling body is made of stainless steel.

6. The vacuum circuit breaker according to claim 1,
wherein said coupling body has a female screw formed along the shaft center of said movable side energization shaft.

7. The vacuum circuit breaker according to claim 1,
wherein said split terminal is made of aluminum or aluminum alloy.

8. The vacuum circuit breaker according to claim 7,
wherein the outer peripheral surface of said split terminal has a black alum ite treatment layer.

9. The vacuum circuit breaker according to claim 1,
wherein said split terminal is made of copper or copper alloy.

10. The vacuum circuit breaker according to claim 9,
wherein the outer peripheral surface of said split terminal has a bronze plating layer.

11. The vacuum circuit breaker according to claim 1,
wherein said split terminal is connected to a flexible conductor; and
said flexible conductor is configured to have a connecting piece at a connection portion on each end and to laminate thin sections in multiple layers or to bundle a large number of thin wires at an intermediate portion.

12. The vacuum circuit breaker according to claim 1,
wherein said split terminal is divided into two which are brought into electrical contact with the energization contact surface from directions crossing at right angles to the shaft center of said movable side energization shaft.

13. The vacuum circuit breaker according to claim 1,
wherein said split terminal is formed with a plurality of groove portions.

14. The vacuum circuit breaker according to claim 1,
wherein a contact portion between said split terminal and the energization contact surface of said movable side energization shaft is applied by silver plating.

15. The vacuum circuit breaker according to claim 1,
wherein said coupling body made of a female screw rod is attached to a hole formed in the outside tip portion of said movable side energization shaft.

16. The vacuum circuit breaker according to claim 1,
wherein said coupling body made of a female screw rod whose outer peripheral portion is a polygonal shape is attached to a hole formed in the outside tip portion of said movable side energization shaft.

17. A gas insulated switchgear mounted with the vacuum circuit breaker as set forth in claim 1.

18. An air insulated switchgear mounted with the vacuum circuit breaker as set forth in claim 1.

\* \* \* \* \*